(12) United States Patent
Sheinfeld et al.

(10) Patent No.: US 7,969,896 B2
(45) Date of Patent: Jun. 28, 2011

(54) METHOD AND SYSTEM FOR PROVIDING CONNECTIVITY OUTAGE DETECTION FOR MPLS CORE NETWORKS BASED ON SERVICE LEVEL AGREEMENT

(75) Inventors: Gil Sheinfeld, Sunnyvale, CA (US); Andrew Ballantyne, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 513 days.

(21) Appl. No.: 11/468,278

(22) Filed: Aug. 29, 2006

(65) Prior Publication Data

US 2008/0056141 A1 Mar. 6, 2008

(51) Int. Cl.
*H04J 1/16* (2006.01)
(52) U.S. Cl. ........ 370/245; 370/241; 370/242; 370/249; 370/252
(58) Field of Classification Search .......... 370/241–253, 370/546; 455/403, 421, 422.1, 423–425, 455/67.11, 67.14, 115.1–115.2, 226.1; 709/223–224
See application file for complete search history.

(56) References Cited

U.S. PATENT DOCUMENTS

| | | | |
|---|---|---|---|
| 6,366,563 B1 * | 4/2002 | Weldon et al. ............ | 370/252 |
| 6,662,223 B1 | 12/2003 | Zhang et al. | |
| 6,853,623 B2 | 2/2005 | Nederveen et al. | |
| 6,868,094 B1 | 3/2005 | Bordonaro et al. | |
| 6,952,421 B1 | 10/2005 | Slater | |
| 7,139,841 B1 | 11/2006 | Somasundaram et al. | |
| 7,181,522 B2 | 2/2007 | Shah et al. | |
| 7,286,515 B2 | 10/2007 | Olson et al. | |
| 7,342,897 B1 | 3/2008 | Nader et al. | |
| 7,353,269 B2 * | 4/2008 | Aki et al. ............ | 709/224 |
| 7,409,706 B1 | 8/2008 | O'Rourke et al. | |
| 2002/0023212 A1 * | 2/2002 | Proudler ............ | 713/164 |
| 2004/0090335 A1 * | 5/2004 | Pfefferseder et al. ........ | 340/600 |
| 2005/0027861 A1 | 2/2005 | Shah et al. | |
| 2005/0123003 A1 | 6/2005 | Bordonaro et al. | |
| 2006/0171316 A1 | 8/2006 | El-Sakkout et al. | |
| 2006/0221844 A1 | 10/2006 | Subramanian et al. | |
| 2006/0242704 A1 | 10/2006 | Aviani et al. | |
| 2007/0124478 A1 | 5/2007 | Abdelhamid et al. | |
| 2008/0016206 A1 | 1/2008 | Ma et al. | |
| 2008/0247331 A1 | 10/2008 | Becker et al. | |

OTHER PUBLICATIONS

"MPLS Embedded Management—LSP Ping/Traceroute and AToM VCCV," Cisco Systems, Inc., Jan. 2004, pp. 1-50.
"Cisco IOS IP Service Level Agreements," Cisco Systems, Inc., Sep. 2004, pp. 1-10.

* cited by examiner

*Primary Examiner* — William Trost, IV
*Assistant Examiner* — Ashil Farahmand
(74) *Attorney, Agent, or Firm* — Cesari and McKenna, LLP; Michael R. Reinemann

(57) ABSTRACT

Method and system for providing network connectivity outage detection for MPLS cores based on service level agreement (SLA) parameters including receiving a service level agreement parameter, determining a probe interval associated with the service level agreement parameter, and performing network connectivity outage detection based on the service level agreement parameter, is disclosed.

21 Claims, 6 Drawing Sheets

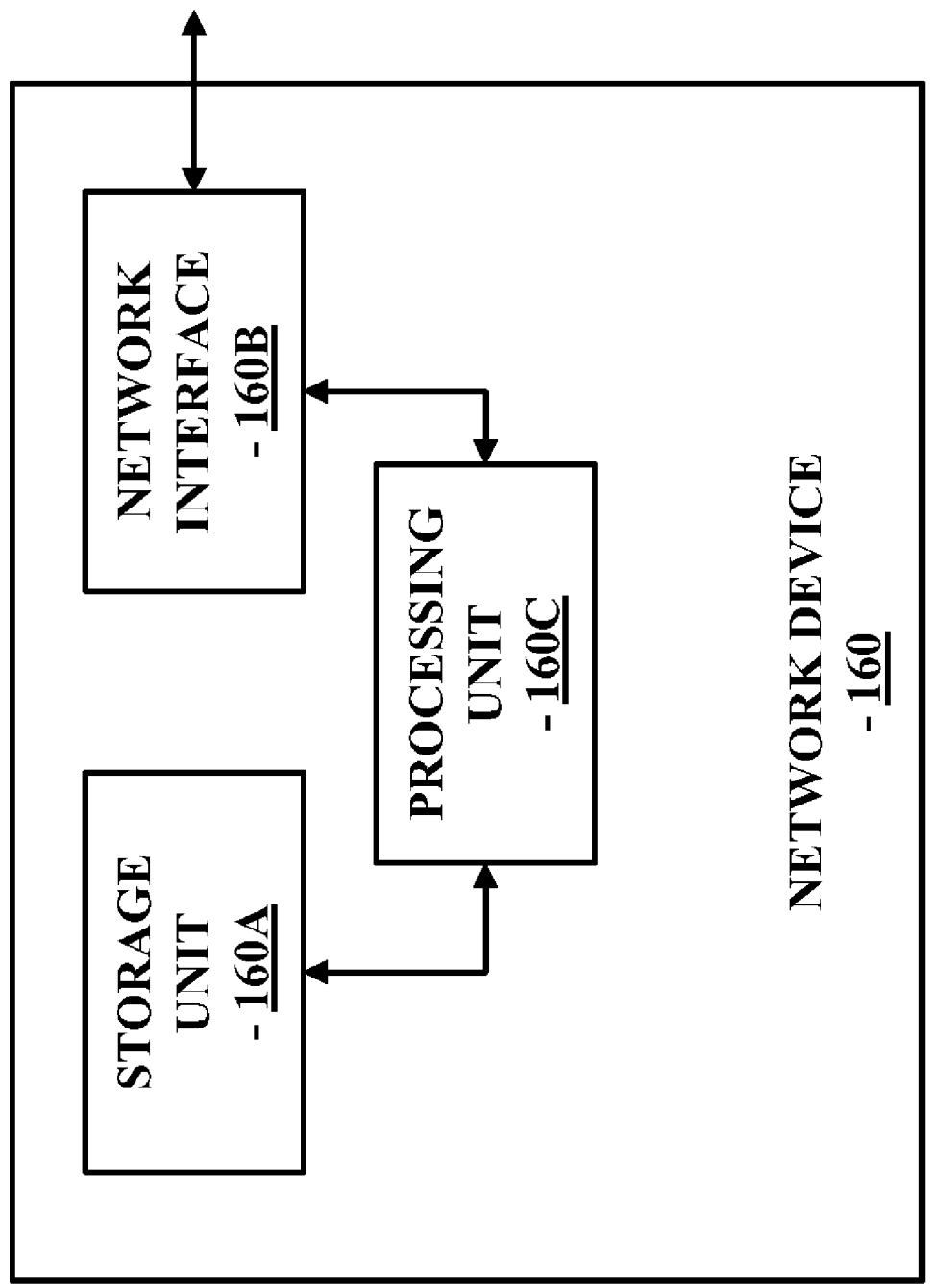

METHOD AND SYSTEM FOR PROVIDING CONNECTIVITY OUTAGE DETECTION FOR MPLS CORE NETWORKS BASED ON SERVICE LEVEL AGREEMENT

FIELD OF THE INVENTION

Figure 1A:
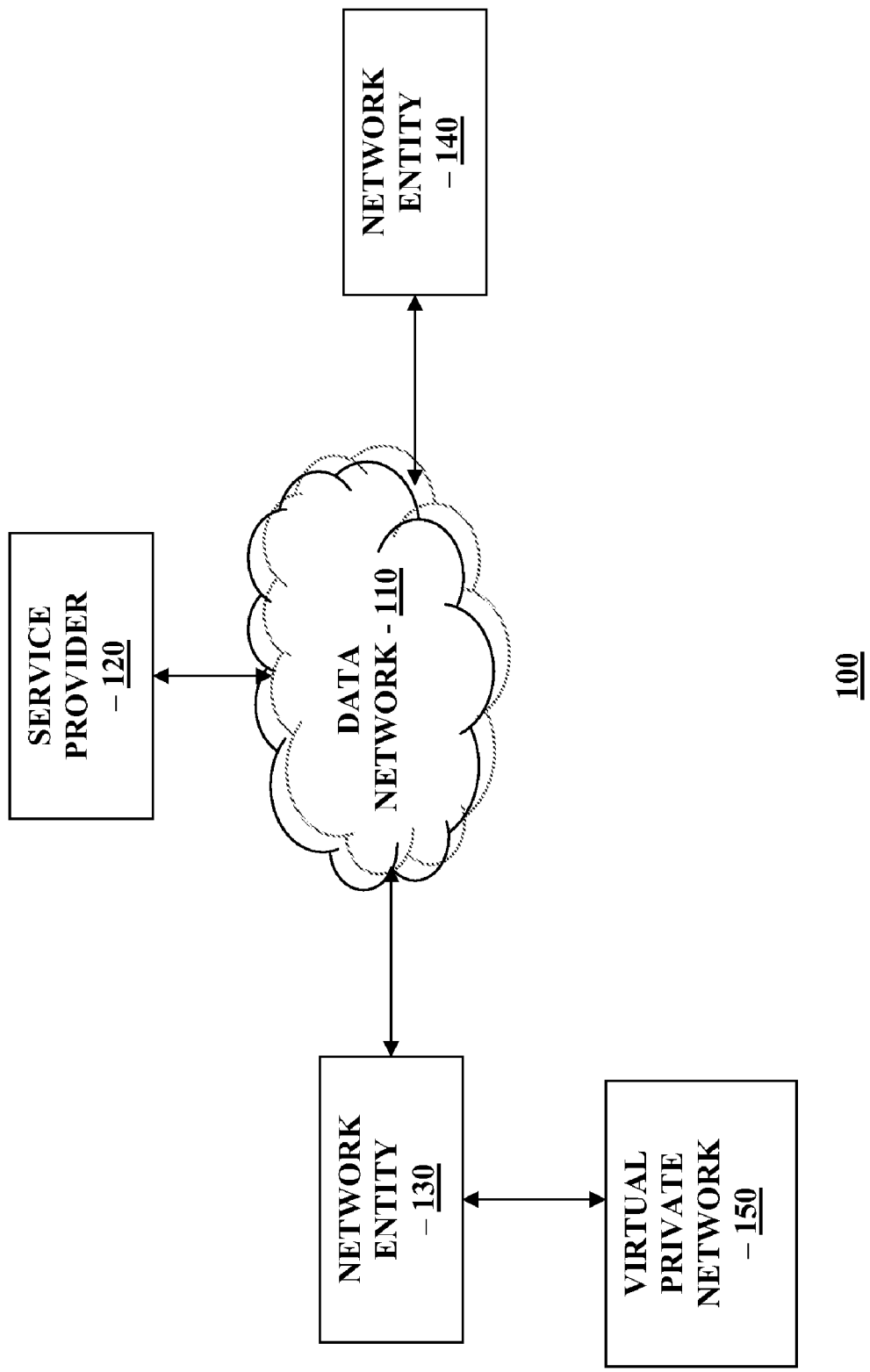

The present invention relates to network management. More specifically, the present invention relates to method and system for providing connectivity outage detection for MultiProtocol Label Switching (MPLS) cores based on service level agreement (SLA) parameters in data networks.

BACKGROUND

Increasing convergence of voice, video and/or data traffic on networks continue to place substantial importance on monitoring the performance of the network to ensure quality of service (QoS) as well as service level agreement (SLA) compliance. Presently available connectivity service level agreements (SLAs) by service providers are heuristic. That is, the approaches are primarily based on prior experience and typically do not provide the service level guarantee. The inability to fulfill the connectivity service level agreement (SLA) guarantee in turn increases costs to the service providers.

Common approaches by network service providers focus on the service level agreement (SLA) parameters which are difficult to translate to corresponding network related conditions, and in particular, when considering the need for intimate familiarity and understanding of the underlying network connectivity monitoring technology, as well as the mechanism by which the network fault management system is configured to execute fault correlation in the network.

Indeed, it is particularly laborious and potentially error prone task to attempt to generate network level settings and conditions based on service level agreement (SLA) parameters. In view of the foregoing, it would be desirable to have methods and systems for providing network connectivity monitoring policy based on service level agreement (SLA) parameters.

BRIEF DESCRIPTION OF THE DRAWINGS

FIG. 1A is a block diagram of an overall data network for practicing one or more embodiments of the present invention;

FIG. 1B is a block diagram of a network device in the data network of FIG. 1A for practicing one or more embodiments of the present invention;

FIG. 2 is a flowchart illustrating connectivity outage detection based on one or more service level agreement (SLA) parameters in accordance with one embodiment of the present invention;

FIG. 3 is a flowchart illustrating connectivity outage detection procedure of FIG. 2 in accordance with one embodiment of the present invention;

FIG. 4 is a flowchart illustrating connectivity outage detection based on service level agreement (SLA) parameters in accordance with still another embodiment of the present invention; and FIG. 5 is a flowchart illustrating connectivity outage detection based on service level agreement (SLA) parameters in accordance with yet another embodiment of the present invention.

DETAILED DESCRIPTION

FIG. 1A is a block diagram of an overall data network for practicing one or more embodiments of the present invention.

Referring to FIG. 1A, a service provider network 100 in one embodiment includes a data network 110 which may include, for example, an IP cloud, and configured to include a Multi-Protocol Label Switching (MPLS) core and further configured to carry layer 3 virtual private network (VPN) traffic. As shown in FIG. 1A, there is also shown a service provider 120 operatively coupled to the data network 110, and which may be configured to include a network management software with fault detection system, and a user interface module (not shown) for providing an interface to a user to receive and/or output information from/to the user.

Referring back to FIG. 1A, also shown are network entities 130, 140 which in one embodiment may be configured as network edge routers. In addition, a virtual private network 150 is shown in FIG. 1A and operatively coupled to network entity 130. As discussed in further detail below, in one embodiment, the service provider 120 may have probes configured to periodically transmit one or more IP packets to the network entities 130, 140 to determine connectivity status of entities operatively coupled to the respective network entities 130, 140. Further, in one aspect of the present invention, any connectivity outage information is received by the service provider 120 within a predetermined time period so as to comply with the respective service level agreement (SLA) associated with the IP probes.

FIG. 1B is a block diagram of a network device in the data network of FIG. 1A for practicing one or more embodiments of the present invention. Referring to FIG. 1B, the network device 160 in one embodiment includes a storage unit 160A operatively coupled to a processing unit 160C. In one aspect, the processing unit 160C may include one or more microprocessors for retrieving and/or storing data from the storage unit 160A, and further, for executing instructions stored in, for example, the storage unit 160A, for implementing one or more associated functions. Referring again to FIG. 1B, in one aspect, the network device 160 is also provided with a network interface 160B which may be configured to interface with the data network 100 (FIG. 1A).

In one embodiment, as discussed in further detail below, the memory or storage unit 160A of the network device 160 may be configured to store instructions which may be executed by the processing unit 160C to detect a service level agreement parameter, determine a probe interval associated with the service level agreement parameter, and perform network connectivity outage detection based on the service level agreement parameter.

FIG. 2 is a flowchart illustrating connectivity outage detection based on one or more service level agreement (SLA) parameters in accordance with one embodiment of the present invention. More specifically, the connectivity outage detection procedure of FIG. 2 based on one or more service level agreement (SLA) parameters in one embodiment is performed by the service provider 120 including a network management software (NMS) with a fault system in one aspect of the present invention. Referring to FIG. 2, in one embodiment, at step 210 a user specified service level agreement (SLA) parameter is received by service provider 120 (FIG. 1A), where the parameter may include, in one embodiment, a user defined time period based on the associated service level agreement (SLA) within which any network connectivity outage is to be reported to the service provider 120.

Thereafter, at step 220, one or more network parameters associated with the service level agreement (SLA) and/or the MPLS core of the data network 110 (FIG. 1A) is determined, for example, as defined by the fault system. More specifically, in one embodiment, the fault system of the service provider 120 is configured to define parameters such as, but not limited to consecutive failure (C), correlation time interval (Tc), ping timeout (Tt), and secondary interval (Ts), and from which, determines the associated probe interval (I) based on the received service level agreement (SLA) parameter as discussed in further detail below.

More specifically, the correlation time interval (Tc) in one embodiment defines the amount of time between the network fault software/system receiving a network fault message (for example, an SNMP trap), and when the network fault is provided to the user. In some fault systems/network management systems, the correlation time interval (Tc) may be negligible, while in other networks, the network may be configured to perform a correlation task which may delay the fault in the network while the system awaits for more messages which it may correlate to, for example, ascertain the root cause associated with the fault. In one aspect, the correlation time interval (Tc) may be defined as a constant value for the network management system.

In addition, the consecutive failure (C) parameter discussed above in one embodiment includes the number of times a probe on a network entity is configured to detect a failure before a fault message (e.g., an SNMP trap) is raised to the network management system. This enhances the possibility that the detected failure is associated with a true connectivity loss, and not to a potentially temporality loss of connection or other temporary network malfunction. In one embodiment, the consecutive failure (C) parameter may be defined as a constant value.

Referring back to FIG. 2, after determining the SLA related network parameters at step 220, the probe interval (I) is determined at step 230 based on the SLA parameter received from the user, and the SLA related network parameters at step 220. In one embodiment, where the received service level agreement (SLA) parameter includes a mean time to detect failure (Tmean), the probe interval (I) is determined based on the following relationship:

$$I=2[(Tmean)-Tc)-(Ts+Tt)*C] \quad (1)$$

For example, in the case where the user specified SLA parameter is mean time to detect failure (Tmean) of 15 minutes, and where the retrieved values for secondary interval (Ts) is 60 seconds, the consecutive failure (C) value is three, the correlation time interval (Tc) is 30 seconds, and with the ping timeout (Tt) of 5 seconds, using the expression (1) shown above, the probe interval is determined by the service provider 120 (FIG. 1A) as 1,350 seconds.

In a further embodiment, the received service level agreement (SLA) parameter may include a maximum time to detect failure (Tmax) value, and in which case, the IP probe interval (I) may be determined based on the following relationship:

$$I=(Tmax-Tc)-(Ts+Tt)*C \quad (2)$$

where Tc is the correlation time interval, Ts includes the secondary interval, C represents the consecutive failure, and Tt is the correlation time as described above.

For example, in the case where the user specified SLA parameter if maximum time to detect failure (Tmax) is 15 minutes, and where the retrieved values for secondary interval (Ts) is 60 seconds, the consecutive failure (C) value is three, the correlation time interval (Tc) of 30 seconds, and with the ping timeout (Tt) of 5 seconds, using the expression (1) shown above, the probe interval is determined by the service provider 120 (FIG. 1A) as 675 seconds.

In this manner, as described above, with only the information associated with the service level agreement (SLA) parameter such as the mean time to detect failure (Tmean), or the maximum time to detect failure (Tmax), in one embodiment of the present invention, the service provider 120 (FIG. 1A) may be configured to determine the IP probe interval (I) for detection of any network connectivity outage within the associated service level agreement (SLA).

That is, referring to FIG. 2 again, after having determined the probe interval (I) at step 230, in one embodiment, the network connectivity outage detection procedure is executed at step 240, where the probe is deployed to the edge routers (for example, the network entities 130, 140) coupled to the MPLS core and periodically pinged at the determined probe interval (I), any connectivity outage detected is reported to the service provider 120 (FIG. 1A) within the time frame determined by the service level agreement (SLA) parameter specified by the user.

In this manner, in one embodiment, the probe interval may define the time period between the detection of a connectivity outage, and the start of the subsequent probe to ping at a higher frequency to determine, for example, whether the detected connectivity outage is a false positive connectivity outage detection. Indeed, in one aspect, an SLA health monitor may be configured such that the user or the service provider 120 does not get flooded with alarms or notifications of initial potential network outages, but rather, where the notification is flagged to the service provider 120 or the user after multiple complete cycles to confirm that the detected connectivity outage is indeed a true network connectivity outage.

Figure 2:
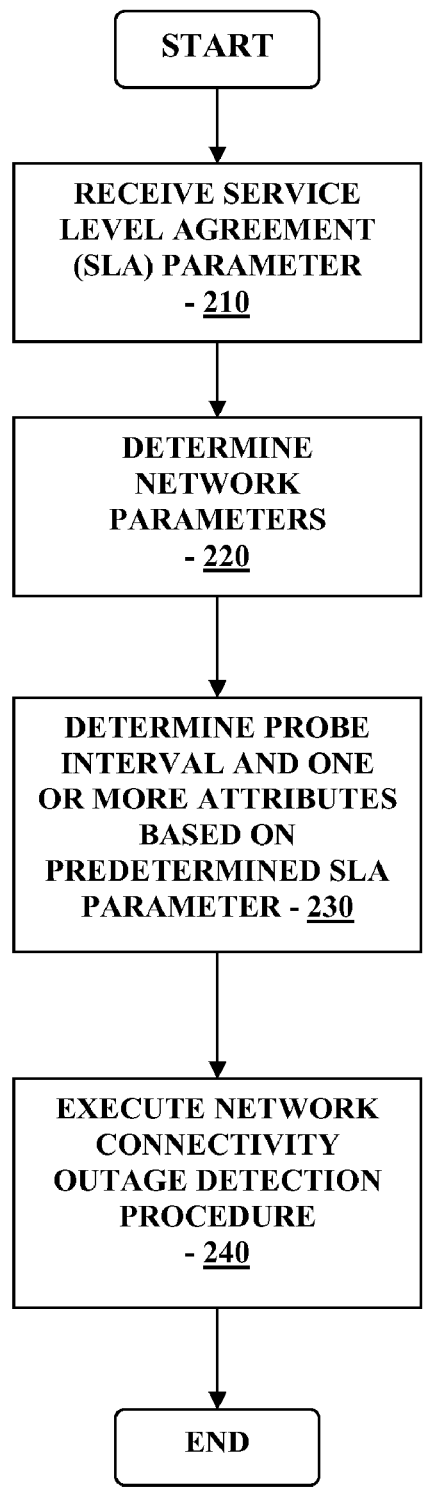
Figure 3:
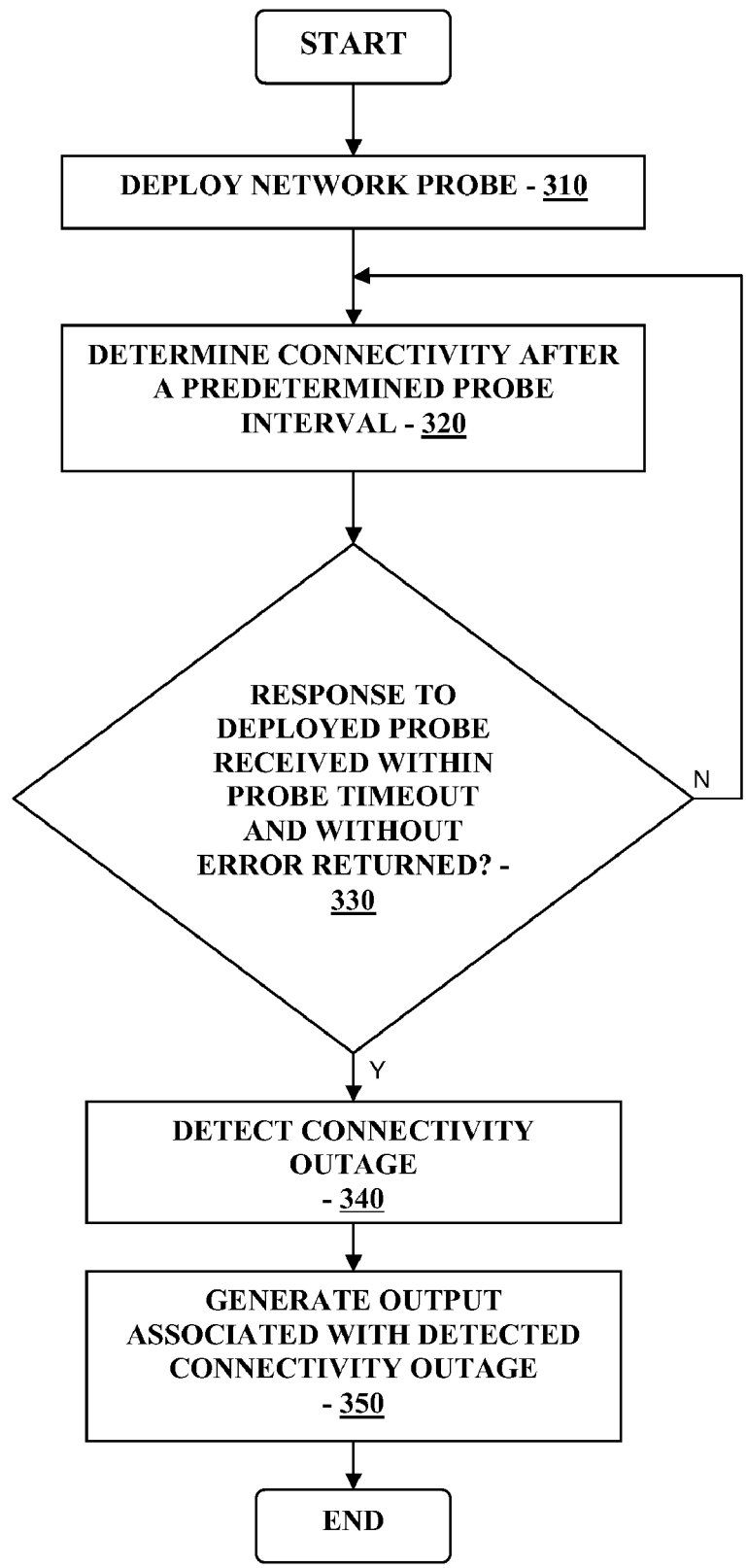

FIG. 3 is a flowchart illustrating connectivity outage detection procedure of FIG. 2 in accordance with one embodiment of the present invention. Referring to FIG. 3, the network connectivity outage detection procedure of FIG. 2 is described in further detail. More specifically, in one embodiment, at step 310, the network probe (for example, the probe) is deployed by the service provider 120 (FIG. 1A). Thereafter, the network probe is configured to determine network connectivity after waiting a predetermined time period. More particularly, referring back to FIG. 3, in one embodiment, the deployed network probe may be configured to determine connectivity after a predefined time period based on, for example, the probe interval (I) described above in accordance with one embodiment of the present invention.

Referring again to FIG. 3, thereafter at step 330, it is determined whether a response to the deployed probe is received within a probe timeout interval (Tt) and without error returned. If it is determined that the no response to the deployed probe is received within the probe timeout (Tt), and without error, the routine returns to step 320 to await for the predetermined time period or the probe interval (I) after which the connectivity is checked again. For example, in one embodiment, one or more errors which may be returned within the probe timeout interval (Tt) includes, but not limited to, "destination unreadable" error, or "time exceeded" error.

Referring again to FIG. 3, if at step 330 it is determined that response to the deployed probe is received within the predetermined probe interval (I) and without error, then at step 340, network connectivity outage is detected. That is if at step 340 it is determined that connectivity outage is detected within the service level agreement (SLA) parameter (for example, based on the received mean time to detect failure (Tmean), or on the received maximum time to detect failure (Tmax)), then at step 350, an alert or notification output associated with the detected connectivity outage is generated by the service provider 120 (FIG. 1A), where the detected connectivity outage is reported or notified within the time period prescribed by the corresponding associated service level agreement (SLA). In one embodiment, the mean time to detect failure (Tmean) or the maximum time to detect failure (Tmax) may be key performance indicators (KPI) of service level agreement (SLA), and in effect, define the service level agreement (SLA).

Figure 4:
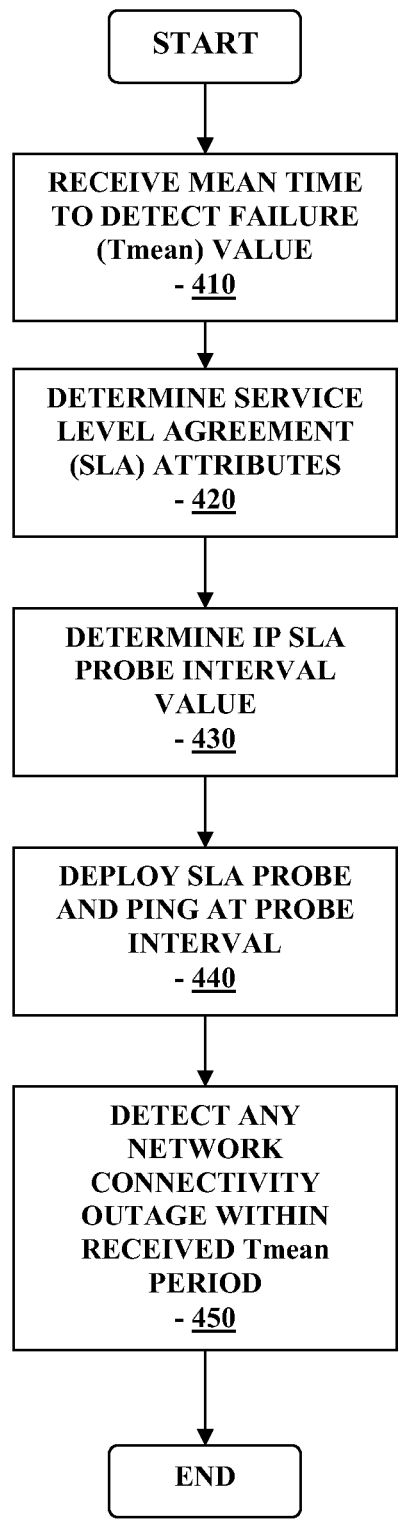

FIG. 4 is a flowchart illustrating connectivity outage detection based on service level agreement (SLA) parameters in accordance with still another embodiment of the present invention. Referring to FIG. 4, at step 410, the mean time to detect failure (Tmean) value associated with the corresponding service level agreement (SLA) is received, and at step 420, the associated service level agreement (SLA) attributes are determined. Then, the IP SLA probe interval value is determined based on a predetermined relationship, such as, for example, expression (1) above described in conjunction with FIG. 2.

Referring back to FIG. 4, thereafter at step 440, the IP probe is deployed in the data network 100 with MPLS core, and periodically pinged at each determined IP SLA probe interval. When network connectivity outage is detected, for example, such outage detection is notified to the service provider 120 (FIG. 1A) within the received mean time to detect failure (Tmean) period.

Figure 5:
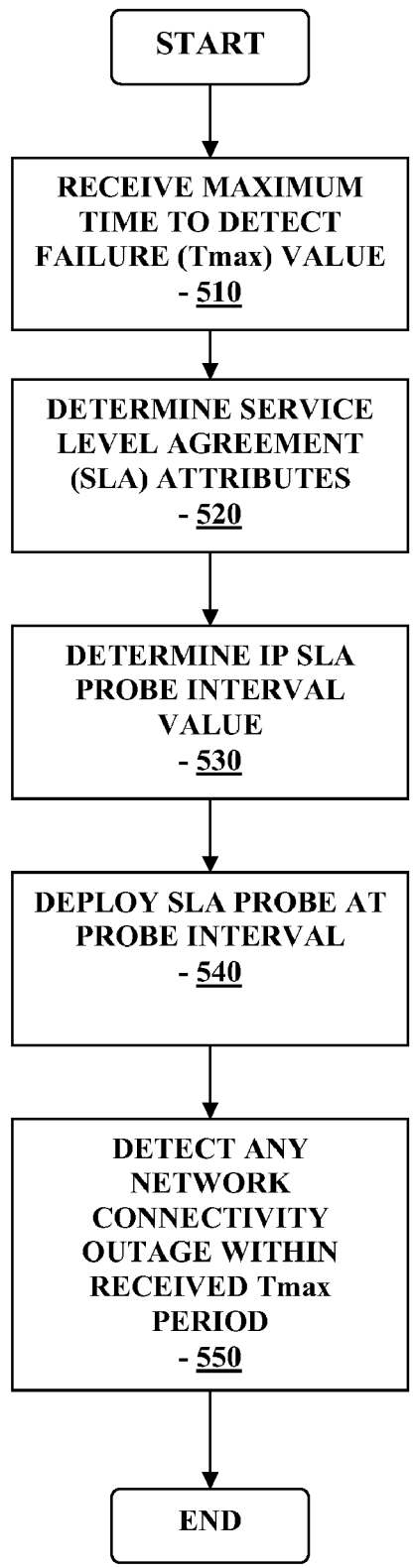

FIG. 5 is a flowchart illustrating connectivity outage detection based on service level agreement (SLA) parameters in accordance with yet another embodiment of the present invention. Referring to FIG. 5, in a further embodiment, at step 510, the maximum time to detect failure (Tmax) associated with the corresponding service level agreement (SLA) is received, and at step 420, the associated SLA attributes are retrieved. Thereafter, at step 430, the IP SLA probe interval value is determined based on a predefined relationship such as, for example, expression (2) described above in conjunction with FIG. 2. Thereafter, at step 540, one or more SLA probes are deployed by the service provider 120 (FIG. 1A) to edge routers (for example, network entities 130, 140), and the deployed probes are periodically pinged at the IP SLA probe interval.

Referring again to FIG. 5, if any connectivity outage is detected, such detected outage is notified to the service provider 120 (FIG. 1A) within the user specified maximum time to detect failure (Tmax) period consistent with the associated service level agreement (SLA).

In this manner, in one aspect, the service provider may view the network connectivity outage detection in terms of proactive service level agreement (SLA) rather than in terms of the associated network conditions. Indeed, in one embodiment, this service level agreement (SLA) parameter approach may be implemented in all network monitoring on the network devices, and may be leveraged, for example, in the QoS management domain.

In one embodiment, the IP service level agreement (SLA) probe may be embedded in all of the attributes associated with the data traffic in the network to ensure that the service level agreement (SLA) without the need for collection or post processing routines. For example, as discussed above, a network monitoring policy may be generated in one embodiment by parsing the intended service level agreement (SLA) to be provided to all the data traffic running over the MPLS core.

By providing one of a predetermined set of service level agreement (SLA) type parameters associated with the connectivity parameters of service, in one embodiment, the corresponding parameters for the monitoring policy may be determined. In turn, the derived monitoring policy will have the necessary network level parameters to ensure the associated service level agreement (SLA) in the MPLS network. For example, as discussed above, the predetermined set of service level agreement (SLA) type parameters may include (1) mean time to detect failure (Tmean), or (2) maximum time to detect failure (Tmax).

The monitoring policy in one aspect factors in the re-converge time after a connectivity fault in the network, as well as the time period for the fault system to perform the associated fault correlation. In one embodiment, the connectivity outage detection policy may be provisioned on the network, such that if a connectivity failure occurs, the associated service provider will be notified of the failure within a time period that is consistent with the service level agreement (SLA). In this manner, in one embodiment, the service provider does not need to have the knowledge of the underlying monitoring technology such as the IP service level agreement (SLA), familiarity with the re-convergence of the IP networks, nor the underlying mechanism for handling fault correlation.

In this manner, within the scope of the present invention, the service provider may generate a network connectivity monitoring policy based on the understanding of the service level agreement (SLA) parameters, and does not need an understanding of the various underlying mechanisms supporting the network including the IP network, the MPLS, or the fault system's correlation.

Accordingly, methods and systems for providing connectivity outage detection for MPLS cores based on service level agreement (SLA) parameters in accordance with the various embodiments may be implemented in, for example, Tier 1, 2, or 3 network service providers to establish connectivity monitoring policy on, for example, the MPLS VPN networks. In addition, within the scope of the present invention, large enterprise entities that include MPLS based networks may effectively implement the connectivity outage detection as described above.

Accordingly, a method for providing network connectivity outage detection in one embodiment includes receiving a service level agreement parameter, determining a probe interval associated with the service level agreement parameter, and performing network connectivity outage detection substantially automatically based on the service level agreement parameter.

The service level agreement parameter in one embodiment may include one of a mean time to detect failure value or a maximum time to detect failure value.

In one aspect, the step of performing the network connectivity outage detection may include deploying a probe associated with the service level agreement parameter and the sending of connectivity outage message/notification (trap).

In addition, the method may also include detecting a network connectivity outage in response to deploying the probe, where the network connectivity outage is detected within the service level agreement parameter.

In a further aspect, the determined probe interval may be associated with one or more of a consecutive failure attribute, a correlation time attribute, a ping timeout attribute, or a secondary interval attribute, where the one or more of a consecutive failure attribute, a correlation time attribute, a ping timeout attribute, or a secondary interval attribute in one embodiment may be retrieved by a service provider.

A method for providing network connectivity outage detection in accordance with another embodiment includes receiving a service level agreement parameter, determining a probe interval associated with the service level agreement parameter, deploying a probe associated with the service level agreement parameter, and detecting a network connectivity failure mode within the service level agreement parameter. In one aspect, the method may further include reporting the connectivity outage within the service level agreement (SLA) to the user.

An apparatus, for example, such as the network device 160 (FIG. 1B) in accordance with still another embodiment includes a network interface, one or more processors coupled to the network interface, and a memory for storing instructions which, when executed by the one or more processors, causes the one or more processors to detect a service level agreement parameter, determine a probe interval associated with the service level agreement parameter, and perform network connectivity outage detection based on the service level agreement parameter.

The memory in yet another aspect may be further configured for storing instructions which, when executed by the one or more processors, causes the one or more processors to deploy a probe associated with the service level agreement parameter.

Moreover, in still another aspect, the memory may be further configured for storing instructions which, when executed by the one or more processors, causes the one or more processors to detect a network connectivity outage associated with the probe, and further, wherein the network connectivity outage is detected within the service level agreement parameter.

The network interface in one aspect may include a service provider.

An apparatus, for example, such as the network device 160 (FIG. 1B) in accordance with still another embodiment includes a network interface, one or more processors coupled to the network interface, and a memory for storing instructions which, when executed by the one or more processors, causes the one or more processors to receive a service level agreement parameter, determine a probe interval associated with the service level agreement parameter, deploy a probe associated with the service level agreement parameter, and detect a network connectivity failure mode based on the probe within the service level agreement parameter.

In one aspect, the service level agreement parameter may include one of a mean time to detect failure value or a maximum time to detect failure value.

Moreover, in a further aspect, the determined probe interval may be further associated with one or more of a consecutive failure attribute, a correlation time attribute, a ping timeout attribute, or a secondary interval attribute, where the one or more of a consecutive failure attribute, a correlation time attribute, a ping timeout attribute, or a secondary interval attribute may be retrieved by a service provider.

A system for providing network connectivity outage detection in accordance with still another embodiment includes means for receiving a service level agreement parameter, means for determining a probe interval associated with the service level agreement parameter, and means for performing network connectivity outage detection based on the service level agreement parameter.

The various processes described above including the processes performed by service provider 120 and/or network entities 130, 140, in the software application execution environment in the data network 100 including the processes and routines described in conjunction with FIGS. 2-5, may be embodied as computer programs developed using an object oriented language that allows the modeling of complex systems with modular objects to create abstractions that are representative of real world, physical objects and their inter-relationships. The software required to carry out the inventive process, which may be stored in the memory (not shown) of the respective service provider 120 and/or network entities 130, 140 may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for providing network connectivity outage detection, comprising:
   receiving a service level agreement parameter at a service provider entity having an interface configured to connect the service provider entity to a data network, and
   a processor coupled to the interface, the processor configured to implement a fault detection system,
   where the service level agreement parameter is associated with a service level agreement between a service provider and a customer;
   storing the received service level agreement parameter at a memory of the service provider entity, the memory storing the received service level agreement parameter coupled to the processor;
   calculating, by the fault detection system implemented by the processor of the service provider entity, a probe interval as a function of the received service level agreement parameter, the calculated probe interval being independent of network and network device conditions; and
   performing network connectivity outage detection in accordance with the calculated probe interval, which is a function of the received service level agreement parameter.

2. The method of claim 1 wherein the service level agreement parameter includes one of a mean time to detect failure value or a maximum time to detect failure value.

3. The method of claim 1 wherein the step of performing the network connectivity outage detection includes deploying a probe.

4. The method of claim 3 further including the step of detecting a network connectivity outage in response to deploying the probe, wherein the network connectivity outage is detected within the service level agreement parameter.

5. The method of claim 1 wherein the function for calculating the probe interval further considers one or more of a consecutive failure attribute, a correlation time attribute, a ping timeout attribute, or a secondary interval attribute.

6. The method of claim 5 wherein the one or more of a consecutive failure attribute, a correlation time attribute, a ping timeout attribute, or a secondary interval attribute are retrieved by the service provider entity.

7. A method for providing network connectivity outage detection, comprising:
   receiving a service level agreement parameter, the service level agreement parameter associated with a service level agreement between a service provider and a customer;
   storing the received service level agreement parameter in a memory of a service provider entity having an interface configured to connect the service provider entity to a data network;

calculating, by a processor of the service provider entity that is coupled to the memory, a probe interval as a function of the received service level agreement parameter, the calculated probe interval independent of network and network device conditions;

deploying a probe wherein the probe checks network connectivity at the calculated probe interval; and detecting a network connectivity failure mode based on the probe within the service level agreement parameter.

8. The method of claim 7 wherein the service level agreement parameter includes one of a mean time to detect failure value or a maximum time to detect failure value.

9. The method of claim 7 wherein the function for calculating the probe interval further considers one or more of a consecutive failure attribute, a correlation time attribute, a ping timeout attribute, or a secondary interval attribute.

10. The method of claim 9 wherein the one or more of a consecutive failure attribute, a correlation time attribute, a ping timeout attribute, or a secondary interval attribute are retrieved by a service provider.

11. An apparatus, comprising:
a network interface;
one or more processors coupled to the network interface; and
a memory for storing instructions which, when executed by the one or more processors, causes the one or more processors to
receive a service level agreement parameter, the service level agreement parameter associated with a service level agreement between a service provider and a customer,
calculate a probe interval as a function of the received service level agreement parameter and independent of network and network device conditions, and
perform network connectivity outage detection in accordance with the calculated probe interval, which is a function of the received service level agreement parameter.

12. The apparatus of claim 11 wherein the service level agreement parameter includes one of a mean time to detect failure value or a maximum time to detect failure value.

13. The apparatus of claim 11 wherein the memory is further configured for storing instructions which, when executed by the one or more processors, causes the one or more processors to deploy a probe.

14. The apparatus of claim 13 wherein the memory is further configured for storing instructions which, when executed by the one or more processors, causes the one or more processors to detect a network connectivity outage associated with the probe, and further, wherein the network connectivity outage is detected within the service level agreement parameter.

15. The apparatus of claim 11 wherein the function for calculating the probe interval further considers one or more of a consecutive failure attribute, a correlation time attribute, a ping timeout attribute, or a secondary interval attribute.

16. The apparatus of claim 15 wherein the network interface includes a service provider.

17. An apparatus, comprising:
a network interface;
one or more processors coupled to the network interface; and
a memory for storing instructions which, when executed by the one or more processors, causes the one or more processors to
receive a service level agreement parameter, where the service level agreement parameter is associated with a service level agreement between a service provider and a customer,
calculate a probe interval as a function of the received service level agreement parameter and independent of network and network device conditions,
deploy a probe wherein the probe checks network connectivity at the calculated probe interval, and
detect a network connectivity failure mode based on the probe within the service level agreement parameter.

18. The apparatus of claim 17 wherein the service level agreement parameter includes one of a mean time to detect failure value or a maximum time to detect failure value.

19. The apparatus of claim 17 wherein the function for calculating the probe interval further considers one or more of a consecutive failure attribute, a correlation time attribute, a ping timeout attribute, or a secondary interval attribute.

20. The apparatus of claim 19 wherein the one or more of a consecutive failure attribute, a correlation time attribute, a ping timeout attribute, or a secondary interval attribute are retrieved by a service provider.

21. A system for providing network connectivity outage detection, comprising:
means for receiving a service level agreement parameter, where the service level agreement parameter is associated with a service level agreement between a service provider and a customer;
means for calculating a probe interval as a function of the received service level agreement parameter, the calculated probe interval independent of network and network device conditions; and
means for performing network connectivity outage detection in accordance with the calculated probe interval, which is based upon the received service level agreement parameter.

* * * * *